Patented Apr. 26, 1938

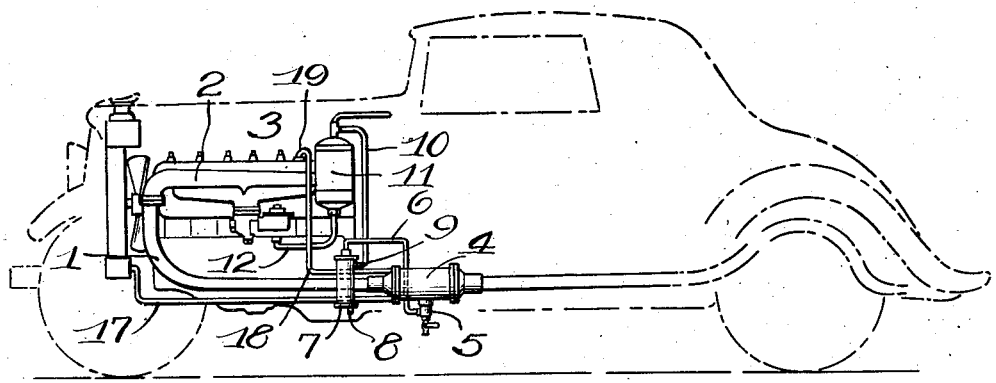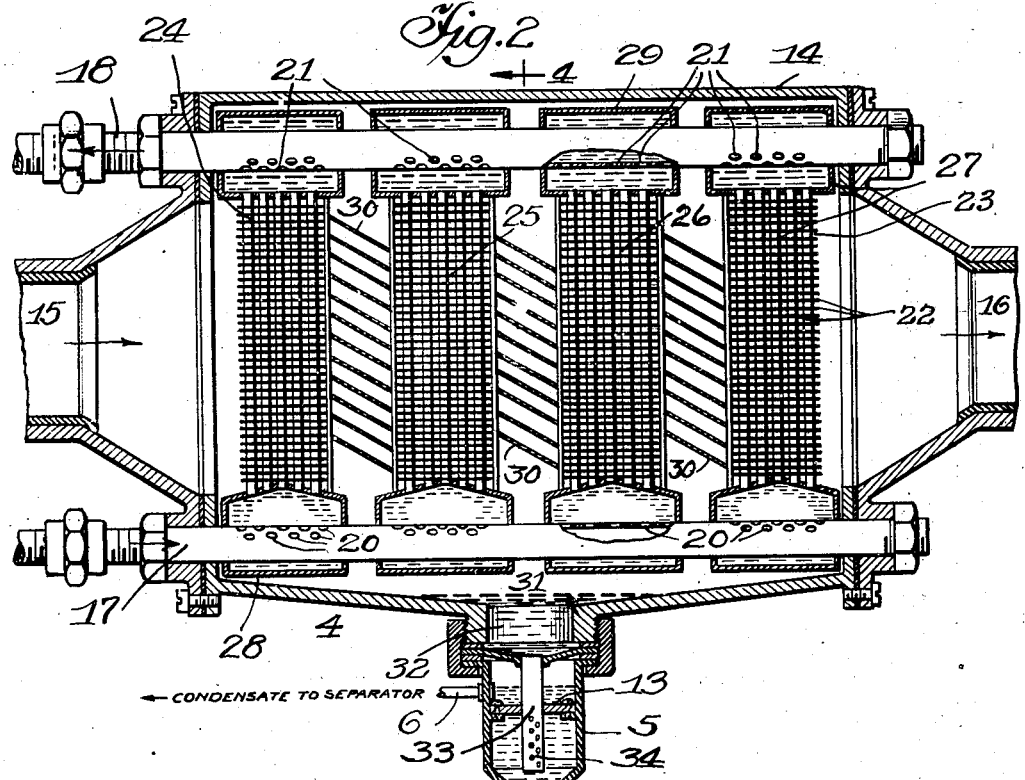

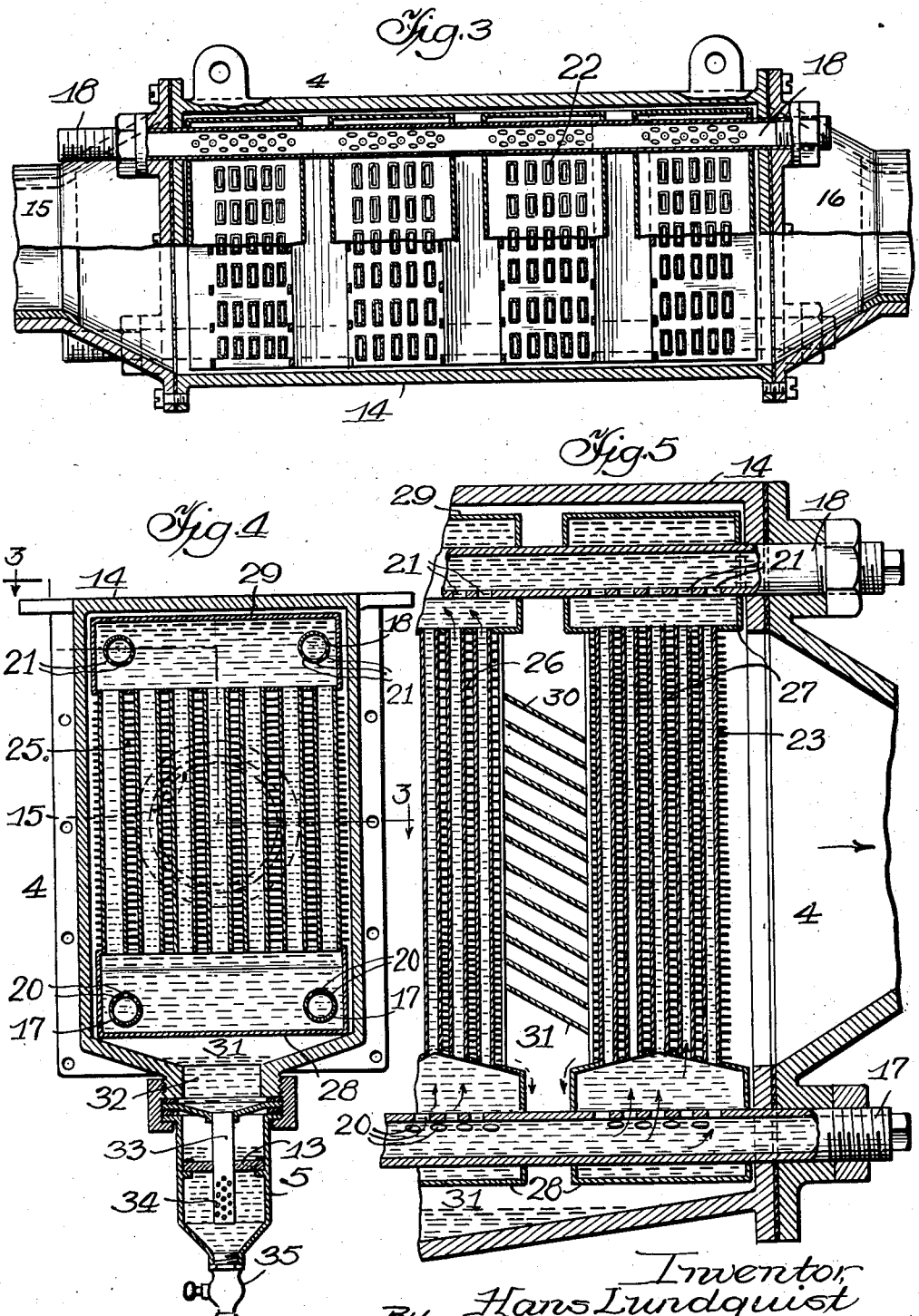

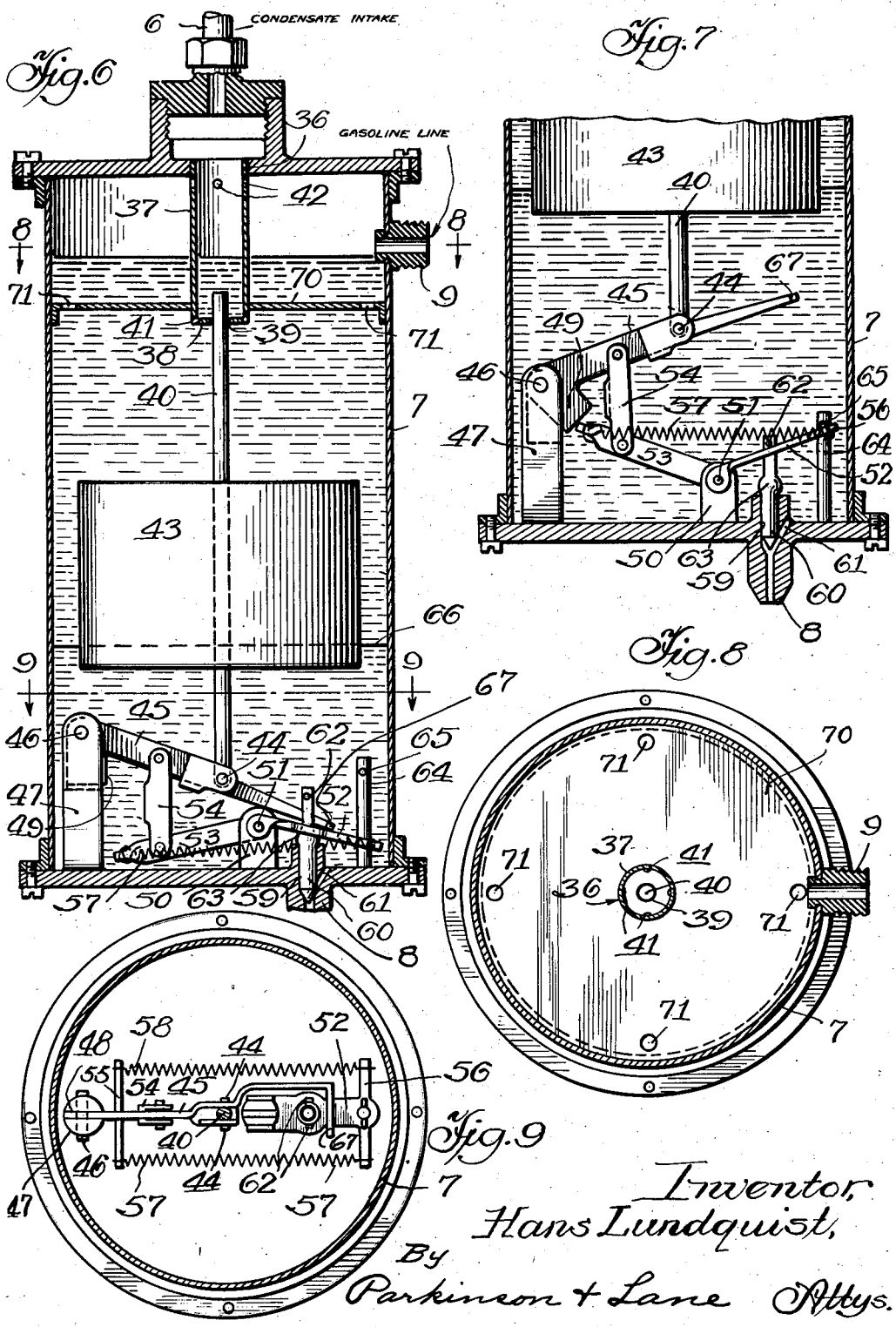

2,115,228

UNITED STATES PATENT OFFICE 2,115,228

MEANS FOR CONDENSING AND REFINING EXHAUST GASES FROM AN INTERNAL COMBUSTION ENGINE FOR RE-USE THEREIN

Hans Lundquist, Chicago, Ill., assignor of one-half to Frederick L. Maytag, Newton, Iowa Application July 7, 1934, Serial No. 734,160

4 Claims. (Cl. 123—119)

This invention relates to means and method of condensing and refining the exhaust gases from an internal combustion engine for re-use therein, and comprises a novel method of accomplishing such result and improved apparatus for carrying such method into effect.

Among the objects of this invention is to enable an increase in efficiency of an internal combustion engine by condensing from the exhaust gases the liquefiable and combustible portions of the same and removing from the condensate any water that may be condensed therewith.

A further object is to provide improved means for separating the water from the liquefiable and combustible portions of the exhaust gases from an internal combustion engine after such portions of the exhaust gases have been condensed.

A still further object is to provide improved means for effecting the results stated in internal combustion engines and more particularly to automobile engines.

Another object is to successfully and efficiently carry out the results stated above in connection with an automobile engine regardless of conditions of roughness of the road.

A still further object is the provision of such apparatus in compact and self-contained form that it may be quickly installed in an automobile.

A further object is to provide improved means for separating the water from the condensed exhaust gases and providing means for preventing the entry of water into the outlet of the separator.

Further objects, advantages and capabilities will hereinafter more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:—

Fig. 1 is a diagrammatic view showing my improved apparatus applied to and connected with the engine of an automobile.

Fig. 2 is a vertical longitudinal section through the condenser of my apparatus.

Fig. 3 is a horizontal section taken on the line 3—3 of Fig. 4.

Fig. 4 is a section on the line 4—4 of Fig. 2.

Fig. 5 is a fragmentary longitudinal vertical section through a portion of the condenser of my device.

Fig. 6 is a vertical transverse section through the separator showing the snap control holding the valve in closed position.

Fig. 7 is a fragmentary vertical transverse section through the separator but showing the parts of the snap control in position for holding the valve open.

Fig. 8 is a horizontal transverse section through the separator and taken on the line 8—8 of Fig. 6.

Fig. 9 is a horizontal transverse section through the separator taken on the line 9—9 of Fig. 6.

Referring more in detail to the drawings, my improved apparatus, as shown in Fig. 1, comprises a connection 1 leading from the exhaust manifold 2 of an internal combustion engine 3 to a condenser 4, which latter is provided at its lower side with a collector 5 which in turn has connection through the pipe 6 to the separator 7. The separator is provided at its bottom with an outlet 8 for draining the separated water therefrom, and near its upper portion with an outlet 9 connected to the pipe 10 leading to the top of the vacuum tank 11, which latter is connected through piping 12 with the carburetor of the internal combustion engine 3.

In general, that portion of the exhaust gases which is liquefiable in this apparatus is liquefied in condenser 4, the condensate descending by gravity into the collector 5, and then after passing through the filter 13 is drawn by suction from the vacuum tank through the piping 6 and discharged into the top of the separator 7. In this separator the water is separated from the remaining portion of the condensate, the water being from time to time emptied from the separator by means of appropriate mechanism described hereinafter in detail, and the combustible portion of the condensate, which is mostly gasolene, floats on top of the water and is conducted under influence of suction from the vacuum tank through pipe 10 into the vacuum tank and withdrawn from there as required through the carburetor to the interior of the engine.

Referring to Figs. 2, 3, 4 and 5, my condenser comprises a casing or body portion 14, having at its forward end the inlet 15 which is connected through pipe 1 to the exhaust manifold of the engine, and at its opposite end is provided with outlet 16 for conducting the uncondensed portions of the exhaust gases to the muffler (if further muffling is desired) or to the outside air if further muffling is not required. Leading into the bottom side of the condenser is the pipe 17 which is connected at any suitable lower portion of the cooling system of the internal combustion engine, this pipe 17 in the present instance being shown as connected to the lower portion of the automobile radiator. Leading back toward the engine from the upper portion of the condenser is the return water pipe 18 which, as shown in Fig. 1, connects back into the cooling system of the engine at 19.

As seen in Fig. 2, the pipe 17 at such portions as are within the water or cold side of the condenser are perforated at 20, and the upper pipe 18 is similarly provided with perforations 21. It will thus be understood that the water from the cooling system of the engine is on one side of the condenser pipes, cells or the like, and the exhaust gases are on the other but separated therefrom by the walls of the condenser, which for convenience are shown in Figs. 2-5 as comprising tubular or hollow portions 22, which in turn are provided with a large number of radiating fins 23 to increase the efficiency of the condenser. As shown in Figs. 2 and 3, I have illustrated this condenser as comprising four condensing units 24, 25, 26 and 27, although any other number may be used as desired to fit the various circumstances. I also wish it understood that any other type of condenser may be used which will utilize the water from the cooling system of the internal combustion engine.

As will be understood from Fig. 2, cooling water is led in through pipe 17 into the receiving heads 28 of the condenser units, and after passing through the body portion of the condenser unit is led out at the top into the discharge heads 29 and from thence through perforations 21 and back to the engine through return pipe 18. There are also provided between each adjacent pair of condenser units inclined baffles 30, which are inclined downwardly and forwardly to conduct the uncondensed exhaust gases to a lower point in the next succeeding condenser unit and thus on to the outlet end of the condenser, thus continuously throwing these uncondensed exhaust gases to the cooler portions of the condenser as they pass therethrough. These baffles also slow up the passage of the exhaust gases through the condenser and increase the efficiency of the same.

Those portions of the exhaust gases which are liquefied in the condenser fall by gravity into the bottom portion 31 of the condenser and from thence flow through opening 32 and pipe 33 into the collector 5. Pipe 33 may or may not as desired be provided with perforations 34. If these perforations are omitted the bottom end of pipe 33 must be left open. If perforations 34 are provided the bottom pipe 33 may or may not be left open as desired. The filter member 13 is mounted on the inside of the collector 5 to surround pipe 33, so that any of the condensate that passes from the collector 5 through pipe 6 to the separator 7 must of necessity pass through this filter 13 and be filtered and cleaned thereby. The collector 5 is provided at its lower portion with a drain cock 35 for use as and when desired.

The interior construction of the separator 7 is shown in Figs. 6-9 and comprises a hollow interior providing a suitable chamber into the top of which pipe 6 discharges the condensate from the collector 5. Suitably secured within the opening 36 in the top of the separator is the well member 37, which has an inwardly extending flange 38 at its bottom end, this flange having a central opening 39 to receive the float rod 40. The bottom of the well 37 is also provided with a suitable number of perforations 41 to permit the liquid condensate to flow quietly into the liquid in the separator. The well member 37 is also provided near its upper end with any desired number of openings 42 to enable the suction from the vacuum tank to pass therethrough and through pipe 6 to the collector to enable the movement of the condensate from the collector through the separator and to the vacuum tank.

Fixed to the float rod 40 is the float 43, rod 40 also extending a substantial distance below this float and pivoted at 44 to lever 45, which in turn is pivotally mounted at 46 to the pedestal 47, which at its upper end is slotted at 48 to permit movement of the heel portion 49 as lever 45 is moved about its pivot 46.

Also provided upon the bottom wall of the separator is pedestal 50, to the upper end of which at 51 are pivoted a pair of lever arms 52 and 53. Lever arm 53 is pivotally connected to lever arm 45 by link 54. As shown in Fig. 9, the free end of lever 53 is provided with an extension 55 which extends laterally in both directions. A similar lateral extension 56 is also provided at the free end of lever arm 52. Connecting the adjacent ends of lateral extensions 55 and 56 are a pair of tension springs 57, 58. Also formed in the bottom of separator 7 is a hole 59 in which is slidably mounted the needle valve 60. Opening 59 is connected with the interior of the separator through the angular opening 61. Needle valve 60 passes upwardly through an opening in lever arm 52, and is provided at its upper end with the two lateral extensions 62 at a sufficient height to permit a certain amount of upward movement of lever arm 52 before the latter strikes the lateral extension 62 to move the needle valve 60 upwardly to open to the exterior of the separator the opening 61 to permit water to flow outwardly therethrough to the exterior of the separator. The needle valve 60 is held against its seat by gravity and also by downward pressure of lever arm 52 against the rounded head 63. Also fixed to the bottom of the separator is the upstanding post 64 carrying at its upper end a stop pin 65 which limits the upward movement of lever arm 52. The position of this stop pin 65 is such that when lever arm 52 strikes it the lever arm 52 will have lifted the needle valve 60 the proper distance to open outlet 61 to permit water to run out of the separator.

The operation of this mechanism will now be described. Water being heavier than gasolene will accumulate in the bottom of the separator, the top of the water in Fig. 6 being indicated by the reference numeral 66. The gasolene portion of the condensate being lighter than water will float on top of the water and rise until it reaches the opening in the connection 9, and will then under influence of the suction from the vacuum tank flow through pipe 10 to the vacuum tank. The float 43 is made of a material of such specific gravity that it will not float in gasolene but will float in water. This means that float 43 will be in its lowermost position through gravity until water accumulates in the bottom of the separator sufficiently to move the float 43 upwardly. When this upward movement has taken place to a sufficient degree it will at the same time have carried rod 40 upwardly with the float, which will move the lever 45 upwardly about its pivot 46. This upward movement of lever 45 will through link 54 also move the outer end of lever arm 53 upwardly, and when this upward movement is sufficient to carry springs 57, 58 above the dead center of pivot 51 they will snap lever arms 52 and 53 upwardly into the position shown in Fig. 7. During this upward movement of lever arm 52 it will strike the lateral extension 62 and raise needle valve 60 sufficiently to open the outlet 61, further movement of lever arm 52 being prevented by its outer end striking stop pin 65. The water accumulated in the bottom of the separator will then flow downwardly out of the separator through opening 61 until the level of the water in the bottom of the separator has been lowered to a sufficient degree to permit the weight of the float 43 to press downwardly on lever 45, which downward pressure is transmitted through link 54 to the free end of lever arm 53 to carry springs 57, 58 below the dead center of pivot 51, at which time these springs will cause lever arms 52 and 53 to again snap downwardly into the position shown in Fig. 6, which will cause the needle valve 60 to close under the action of gravity and also because of its being pressed downwardly by lever arm 52 pressing against head 63 on the needle valve. The upward movement of the free end of lever arm 53 is limited by said end striking against heel 49 of lever arm 45, as shown in Fig. 7. Downward movement of this snap control is limited by the laterally bent portion 67 on the free end of lever arm 45 striking against the upper surface of lever arm 52, as shown in Fig. 6.

In order to prevent the liquid contents of the separator from unduly splashing therein, I have provided near the upper portion of the separator a cross-partition 70 which is preferably of thin metal and secured to the inner walls of the separator in any desired manner. This cross-partition 70 is provided with a central opening within which fits the depending well 37, and also near its outer edge or any other location desired are formed a plurality of openings 71 through which the gasolene within the separator can pass upwardly above the cross-partition 70, in order to find access through the outlet connection 9 and into pipe 10. The greater portion of the body of liquid being below the cross-partition 70 it will be readily understood how this cross-partition functions to greatly reduce the splashing action within the separator.

From the above it is seen that that portion of the exhaust gases which is liquefiable under the conditions of my improved apparatus is liquefied in the condenser, filtered in the collector, the water separated therefrom in the separator, and the gasolene of the condensate returned to the vacuum tank where it mixes with the gasolene from the gasolene tank and is fed therewith as required into the internal combustion engine for re-use.

I have found that with this apparatus the mileage of an automobile is very substantially increased and the efficiency of an internal combustion engine very greatly improved. While I have for purposes of illustration shown this device used in connection with an automobile engine, I wish it understood that the use of the same in connection with any interral combustion engine is considered as falling within the scope of my invention.

Having now described my invention, I claim:

1. Apparatus for condensing a portion of the exhaust gases from an internal combustion engine comprising a condenser, a collector for collecting and filtering the condensate, and a separator for separating water from the condensate.

2. Apparatus for condensing and separating the liquefiable combustible portion of the exhaust gases from an internal combustion engine for re-use therein, comprising a condenser connected on one side to the exhaust of the engine and connected on the other side to the water cooling system of the engine, means in said condenser for conducting away the uncondensed portion of the gases and preventing the same from being returned to the engine, means for collecting and filtering the condensate from said condenser, a separator for separating and removing water from the condensate, means in the separator for controlling the separation of water from the combustible condensate, and means for returning the combustible portions of the condensate from which the water has been separated back to the intake of the engine for reuse.

3. Apparatus for condensing and separating the liquefiable combustible portion of the exhaust gases from an internal combustion engine for re-use therein, comprising a condenser connected on one side to the exhaust of the engine and connected on the other side to the water cooling system of the engine, means in said condenser for conducting away the uncondensed portion of the gases and preventing the same from being returned to the engine, means for collecting and filtering the condensate from said condenser, a separator for separating and removing water from the condensate, means in the separator for controlling the separation of water from the combustible condensate, and means for returning the combustible portions of the condensate from which the water has been separated back to the intake of the engine for reuse, said last mentioned means including a vacuum tank connected with the vacuum side of the engine and the upper portion of the separator whereby the suction from the vacuum tank will cause the condensate to move from the collector to the separator, and the water-freed liquefied combustible portion of the exhaust gases to move from the separator to the vacuum tank, from which latter it is conducted back to the intake side of the engine for reuse therein.

4. A device for condensing and separating the liquefiable and combustible content of the exhaust gases discharged from an internal combustion engine, comprising in combination, a casing, a condensing element in said casing having a water receiving side and an exhaust gas receiving side, portions of said condensing element being spaced from the interior of said casing to form water inlet and outlet spaces, a pipe connection to said water inlet space from the water cooling system of the internal combustion engine, a pipe connection from said water outlet space back to said water cooling system, a connecting conduit from the exhaust pipe of said engine to the exhaust gas receiving side of said condensing element, a receptacle for collecting the condensate from said condensing element, means for conducting said collected condensate back to the intake of the engine for reuse therein, means for conducting the uncondensed exhaust gases from said condensing element to the outside atmosphere, whereby the water from the cooling system of the engine will be used for condensing a portion of the exhaust gases, and only the condensate will be returned therefrom to the engine for reuse therein, and a separator for separating water from the condensate, said separator being included in the means for conducting said collected condensate back to the intake of the engine whereby the water in the condensate will be separated and removed from the condensate before the latter enters the engine for reuse therein.

HANS LUNDQUIST.